US012023704B2

(12) United States Patent
Dubiel et al.

(10) Patent No.: US 12,023,704 B2
(45) Date of Patent: Jul. 2, 2024

(54) WET/DRY HOSE END SPRAYER

(71) Applicant: Chapin Manufacturing, Inc., Batavia, NY (US)

(72) Inventors: David J. Dubiel, Franconia, NH (US); James R. Fontaine, Marilla, NY (US); Mark T. MacLean-Blevins, Westminster, MD (US)

(73) Assignee: CHAPIN MANUFACTURING, INC., Batavia, NY (US)

( * ) Notice: Subject to any disclaimer, the term of this patent is extended or adjusted under 35 U.S.C. 154(b) by 0 days.

(21) Appl. No.: 17/568,342

(22) Filed: Jan. 4, 2022

(65) Prior Publication Data

US 2022/0126312 A1 Apr. 28, 2022

Related U.S. Application Data

(63) Continuation of application No. 16/555,560, filed on Aug. 29, 2019, now Pat. No. 11,213,841.

(51) Int. Cl.
*B05B 7/30* (2006.01)
*B05B 7/24* (2006.01)

(52) U.S. Cl.
CPC .............. *B05B 7/30* (2013.01); *B05B 7/2462* (2013.01); *B05B 7/2443* (2013.01)

(58) Field of Classification Search
CPC ....... B05B 7/30; B05B 7/2462; B05B 7/2443; B05B 7/1209; B05B 7/2445; B01F 25/316
USPC .......................................................... 239/318
See application file for complete search history.

(56) References Cited

U.S. PATENT DOCUMENTS 2,991,939 A * 7/1961 Packard .................... B05B 7/12 239/114
3,447,753 A * 6/1969 Proctor ..................... B05B 7/12 239/317
3,770,205 A 11/1973 Proctor et al.
3,940,069 A * 2/1976 Gunzel, Jr. ........... B05B 7/2443 239/394
4,347,224 A 8/1982 Beckert et al.
4,369,921 A * 1/1983 Beiswenger .............. B05B 1/12 239/317

(Continued)

FOREIGN PATENT DOCUMENTS

WO 2005095722 10/2005
WO 2017134558 8/2017
WO 2018234752 12/2018

*Primary Examiner* — Christopher R Dandridge
*Assistant Examiner* — Kevin Edward Schwartz
(74) *Attorney, Agent, or Firm* — Woods Oviatt Gilman LLP; Katherine H. McGuire, Esq.

(57) ABSTRACT

A sprayer head may be removably mounted onto a concentrate tank of a hose end sprayer. The sprayer head may include a valve assembly having a valve body having a first axis of rotation selectively movable between a closed orientation, a wet mode orientation, and a dry mode orientation. A metering plate may include a first annular series of spaced-apart flow-metering holes with each successive respective flow-metering hole has an increasing hole diameter adapted to withdraw a selectively adjustable amount of a concentrate from the concentrate tank when the valve body is in either the wet mode orientation or the dry mode orientation. The metering plate has a second axis of rotation which is non-coaxial with the first axis of rotation.

15 Claims, 9 Drawing Sheets

(56) References Cited

U.S. PATENT DOCUMENTS 4,475,689 A * 10/1984 Hauger ................. B05B 7/2443 239/318
4,572,235 A * 2/1986 Katzer .................. B01F 25/316 137/268
4,901,923 A 2/1990 Mcroskey et al.
5,183,206 A 2/1993 Gavin
5,303,729 A 4/1994 DeMarco
6,378,785 B1 4/2002 Dodd
6,425,534 B2 7/2002 Ketcham et al.
6,546,949 B1 4/2003 Gilmore
6,578,776 B1 6/2003 Shanklin et al.
6,604,546 B1 8/2003 Gilmore
6,659,117 B2 12/2003 Gilmore
6,672,520 B2 1/2004 Shanklin et al.
6,749,133 B1 * 6/2004 Ketcham ............... B05B 7/2443 239/525
6,805,149 B1 * 10/2004 Gilmore ................ B05B 7/2445 137/268
6,902,668 B2 6/2005 Benham
6,913,209 B2 7/2005 Shanklin et al.
7,118,049 B2 10/2006 Dodd
7,188,786 B2 3/2007 Dodd
7,237,728 B1 * 7/2007 Laible ................... B05B 7/2443 239/347
7,325,752 B2 2/2008 Shanklin et al.
8,235,310 B2 * 8/2012 Birrenkott ............. B05B 7/2478 239/327
8,464,663 B2 6/2013 Kodat
9,062,777 B2 6/2015 Shanklin et al.
9,302,283 B2 * 4/2016 Plantz ................... B01F 25/312
10,118,137 B2 11/2018 Schwartz et al.
10,138,110 B2 11/2018 Bates et al.
10,160,677 B2 12/2018 Ferguson et al.
10,654,077 B2 * 5/2020 Wang ...................... B08B 3/026
10,850,241 B2 * 12/2020 Hubmann ............. B01F 25/312
2005/0077370 A1 4/2005 Decker et al.
2005/0098656 A1 * 5/2005 Dodd .................... B05B 7/1209 239/507
2007/0145162 A1 6/2007 Macmahon
2010/0059605 A1 * 3/2010 Plantz ............... B01F 25/31243 239/316
2013/0175363 A1 * 7/2013 Dobias .................. B05B 7/2464 220/676
2017/0081165 A1 * 3/2017 Bates ................... B67D 3/0012
2019/0015876 A1 1/2019 Wang

* cited by examiner

WET/DRY HOSE END SPRAYER

FIELD OF THE INVENTION

The present invention generally relates to sprayers, and more particularly to a hose end sprayer configured to selectively dilute a fluid or solid concentrate with a diluent prior to spraying, and still more particularly to a wet/dry hose end sprayer that allows for metered selection of the dilution rate of the concentrate in either a wet mode or dry mode.

BACKGROUND OF THE INVENTION

Sprayers, such as hose end sprayers, are typically used for application of liquid fertilizers and pesticides including herbicides, insecticides and the like. Many of these hose end sprayers are limited to liquid applications and cannot be used with non-liquid concentrates, such as powders and particulates. To alleviate this deficiency, hose end sprayers have been developed to dissolve and spray solid materials. However, these systems typically require flooding of the concentrate tank to first dissolve the solids, followed by application of the liquid solution. As a result, these systems function nearly identical to liquid-only systems. Each of the above systems is also subject to a number of drawbacks. By way of example and without limitation, such drawbacks may include leaking of the sprayer at a number of connection points (e.g., hose/sprayer interface, concentrate tank/sprayer head interface) and inability to independently control dilution ratio of solid concentrate during dry applications.

Selectable wet/dry systems have been developed which allow a user to spray either liquid or solid concentrates using a single sprayer unit. In this case, the concentrate tank is flooded with water to dilute the solid concentrate prior to spraying through the spray nozzle. To control operation, a linear selector plate internal to the head provides variable dilution settings for liquid concentrate, an off position, and then a final position that opens a pressure port and closes a vent for use with solid concentrate. The limitation to this is that there is no variability to the dilution rate while using solid concentrate.

Thus, there remains a need for a sprayer system that minimizes the chances of leakage while also enabling metered dilution of both liquid and non-liquid concentrates. The present invention satisfies this as well as other needs.

SUMMARY OF THE INVENTION

In view of the above and in accordance with an aspect of the present invention, the present invention is generally directed to a hose end sprayer apparatus comprising a concentrate tank and a sprayer head. The concentrate tank has a bottom wall and a sidewall defining an open top edge, all defining an open interior configured to hold a concentrate therein. The sprayer head is removably mounted onto the concentrate tank and includes an inlet end configured to receive a stream of water and an outlet end configured to discharge the stream of water. A flow tube is located between the inlet end and the outlet end and defines an injection orifice therein. A suction tube is coupled to the injection orifice of the flow tube at a first end, and has a second end located within the open interior of the concentrate tank and above the bottom wall.

A valve assembly is located between the inlet end and the flow tube. The valve assembly comprises a valve housing defining an inlet opening in communication with the inlet end, a flow opening in communication with the flow tube, and a concentrate opening in communication with the open interior of the concentrate tank, and a valve body selectively movable within the valve housing. The valve body defines an inlet orifice in communication with the inlet opening, first and second flow orifices selectively positionable to communicate with the flow opening, a concentrate orifice selectively positionable to communicate with the concentrate opening, and a vent opening selectively positionable to communicate with the concentrate opening.

When the sprayer head is in a closed orientation, the valve body is moved whereby neither the first nor the second flow orifice communicates with the flow opening and wherein the concentrate opening is closed by the valve body. When the sprayer head is in a wet mode orientation, the valve body is moved whereby the first flow orifice communicates with the flow opening and wherein the vent opening communicates with the concentrate opening to draw concentrate from the concentrate tank into the flow tube. When the sprayer head is in a dry mode orientation, the valve body is moved whereby the second flow orifice communicates with the flow opening and wherein the concentrate orifice communicates with the concentrate opening and is configured to direct a diverted portion of the stream of water into the concentrate tank.

In a further aspect of the present invention, the valve assembly further includes a knob coupled to a shaft on the valve body for selectively rotating the valve body within the valve housing. Still further, the sprayer head may include an anti-siphon assembly proximate to the inlet end and the outlet end may include a rotatable nozzle. Moreover, the flow tube may include a venturi constriction wherein the injection orifice is located at or downstream the venturi constriction.

In still another aspect of the present invention, the sprayer head further includes a metering plate located between the first end of the suction tube and the injection orifice of the flow tube. The metering plate defines a first annular series of spaced-apart flow-metering holes, wherein successive respective flow-metering holes have an increasing hole diameter. The metering plate is adapted to rotate to align a selected flow-metering hole of the annular series of spaced-apart flow-metering holes in fluid communication with the first end of the suction tube and the injection orifice of the flow tube to thereby inject a selectively adjustable amount of concentrate from the concentrate tank into the stream of water. The metering plate may further define a second annular series of spaced-apart stop recesses, wherein each respective stop recess within the second annular series radially aligns with a respective flow-metering hole of the first annular series. A single respective stop recess receives a detent when the selected flow-metering hole is aligned with the first end of the suction tube and the injection orifice of the flow tube.

In yet another aspect of the present invention, the sprayer head may further include a dilution selector wheel coupled to the metering plate. Actuation of the dilution selector wheel may rotate the metering plate. The dilution selector wheel may also include a series of indicia to signal to a user of the hose end sprayer apparatus the selected flow-metering hole. The sprayer head may further include a cap portion having a first end including a cap sidewall configured to releasably mount the cap portion and the sprayer head to the open top edge of the concentrate tank. A second end having a first planar portion may be located between the first end of the suction tube and the metering plate. The first planar portion may be configured to receive a first seal located between a top face of the first planar portion and the selected flow-metering hole on the metering plate. The first planar portion may also include a diaphragm configured to deflect when the sprayer head is in the dry mode orientation to apply a force to the first seal to improve sealing between the cap portion and the metering plate. The second end of the cap portion may also include a second planar portion, wherein the second planar portion defines a detent receiving well configured to slidably receive the detent therein.

In still a further aspect of the present invention, the sprayer head further includes a concentrate basket configured to hold a dry product. The basket includes a top collar configured to mount between the open top edge of the concentrate tank and the first end of the cap portion. The cap sidewall further defines a flow channel in communication with the concentrate opening defined with the valve housing. Inner and outer basket sidewalls are coaxially aligned along the longitudinal axis of the basket and extend into the open interior of the concentrate tank. The inner basket sidewall has an internal diameter defining a channel slightly larger than an outer diameter of the suction tube and the outer basket sidewall has an external diameter smaller than an internal diameter of the concentrate tank sidewall. A basket bottom extends between bottom edges of the inner and outer basket sidewalls. The suction tube is configured to pass through the channel with the second end of the suction tube extending outwardly of the basket bottom. When the sprayer head is in the dry mode orientation, the concentrate opening and the flow channel are configured to direct the diverted portion of the stream of water into the basket to dissolve the dry product. One or both of the outer basket sidewall and the basket bottom define a plurality of openings whereby dissolved product passes out of the basket and into the concentrate tank and the suction tube is configured to transport the dissolved product from the concentrate tank to the flow tube.

Still further, the outer basket sidewall may include a first wall surface and an opposite second wall surface. The first wall surface may include vertically extending, spaced grooves extending through a first portion of the outer basket sidewall and the second wall surface may include horizontally extending, spaced grooves extending through a second portion of the outer basket sidewall. The openings are formed where the vertically extending, spaced grooves coincide with the horizontally extending, spaced grooves.

In another aspect of the present invention, a sprayer head is configured to be removably mounted onto a concentrate tank of a hose end sprayer. The sprayer head comprises a valve assembly having a valve body selectively movable between a closed orientation, a wet mode orientation, and a dry mode orientation; and a metering plate defining a first annular series of spaced-apart flow-metering holes. Successive respective flow-metering holes have an increasing hole diameter adapted to withdraw a selectively adjustable amount of a concentrate from the concentrate tank when the valve body is in either the wet mode orientation or the dry mode orientation. The valve assembly may further include a knob coupled to a shaft on the valve body for selectively rotating the valve body. Still further, a dilution selector wheel may be coupled to the metering plate wherein actuation of the dilution selector wheel rotates the metering plate. The dilution selector wheel may also include a series of indicia to signal to a user a respective flow-metering hole.

Additional objects, advantages and novel aspects of the present invention will be set forth in part in the description which follows, and will in part become apparent to those in the practice of the invention, when considered with the attached figures.

DETAILED DESCRIPTION OF THE PREFERRED EMBODIMENTS

Figure 1:
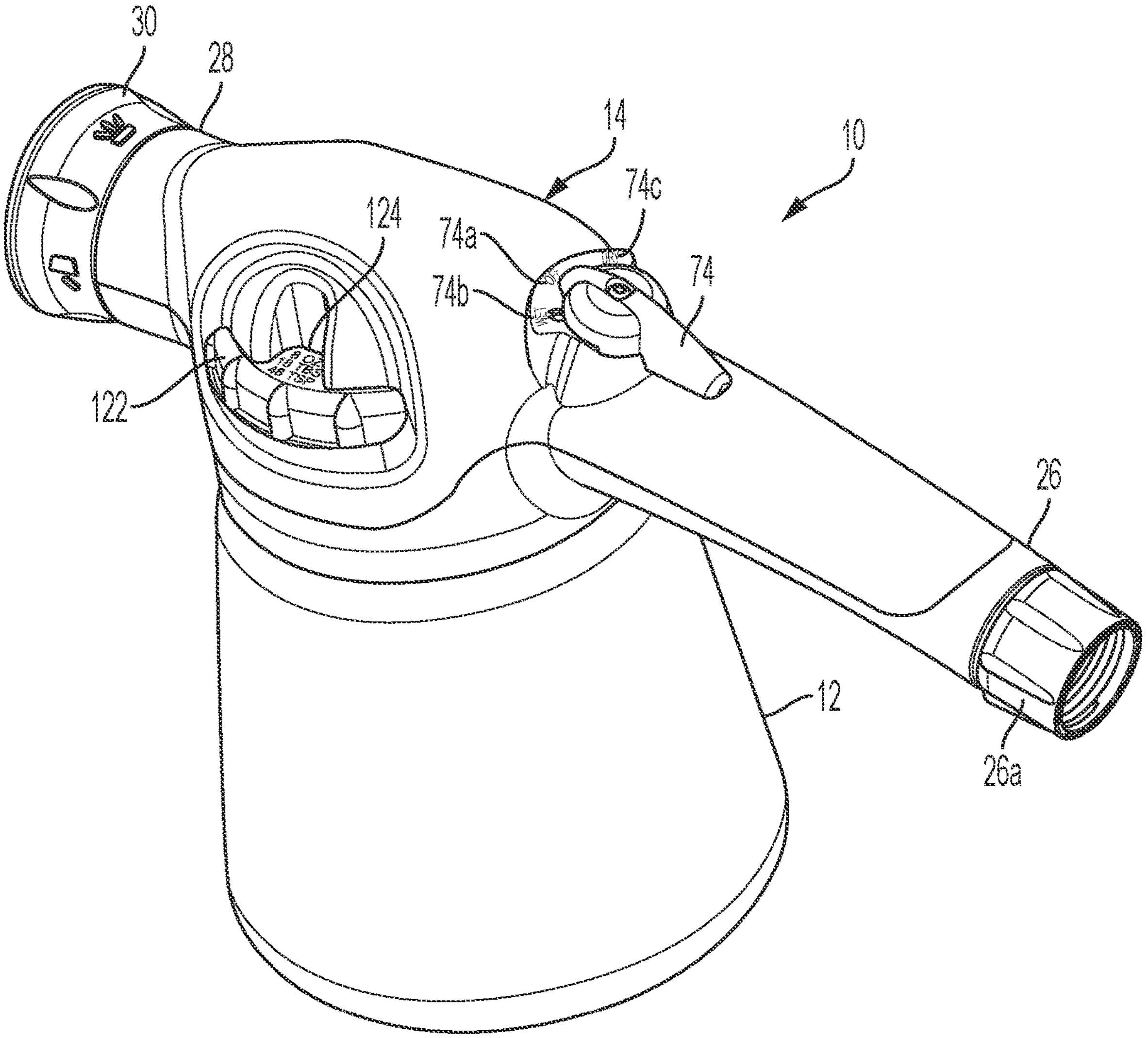
FIG. 1 is a perspective view of a hose end sprayer apparatus in accordance with an aspect of the present invention.
Figure 2:
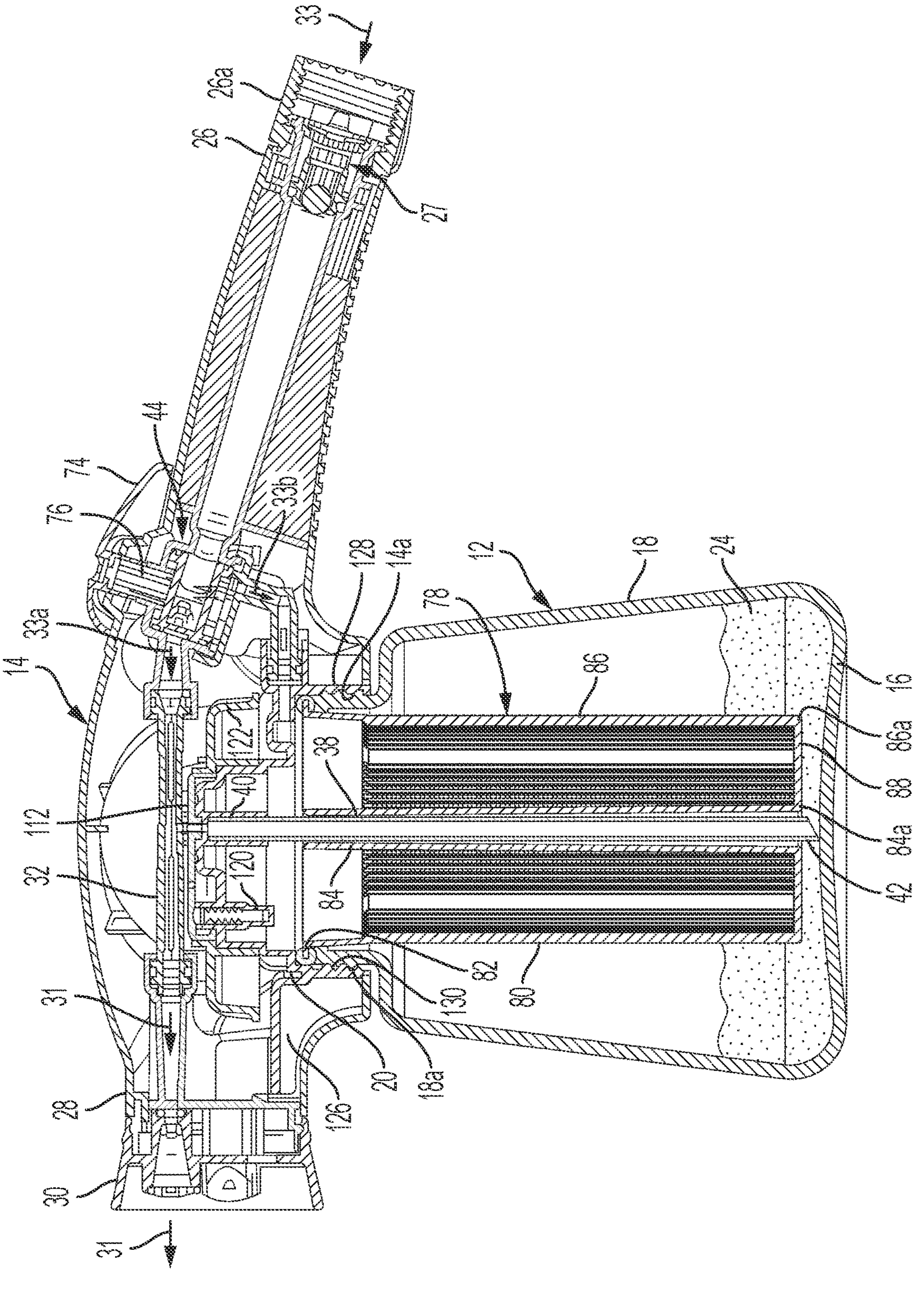
FIG. 2 is a longitudinal cross view of the sprayer apparatus shown in FIG. 1.

Referring now to FIGS. 1 and 2, in accordance with an aspect of the present invention, hose end sprayer apparatus 10 may generally comprise a concentrate tank 12 and sprayer head 14. As seen most clearly in FIG. 2, concentrate tank 12 has a bottom wall 16 and a sidewall 18 which defines an open top edge or perimeter 20. Concentrate tank 12 defines an open interior 22 for holding a concentrate 24 therein. Sprayer head 14 is removably mounted onto concentrate tank 12, such as through cooperating male/female threaded features **14*a*/18*a* formed on sprayer head 14 and tank sidewall 18, respectively. Sprayer head 14 has an inlet end 26 terminating with, such as for example, a female hose coupling 26*a* adapted to threadably receive a male end of a standard garden hose (not shown). Sprayer head 14 may also include an anti-siphon assembly 27 proximate inlet end 26 to prevent unwanted backflow of water. An opposing outlet end 28 may include a nozzle 30 for discharging a stream of water/concentrate mixed solution 31. In accordance with one aspect of the present invention, nozzle 30** may be a rotatable nozzle configured to provide for a plurality of spray profiles through the nozzle, such as but not limited to a narrow stream, a dispersed shower or vertical or horizontal fan spray profiles. It should be noted that while described as a garden hose and water, those skilled in the art should recognize that alternative piping and tubing, as well as other fluids, may be used within the apparatus described herein.

Thus, references to a garden hose and water are merely representative and are by no means limiting the present invention solely thereto.

Figure 3:
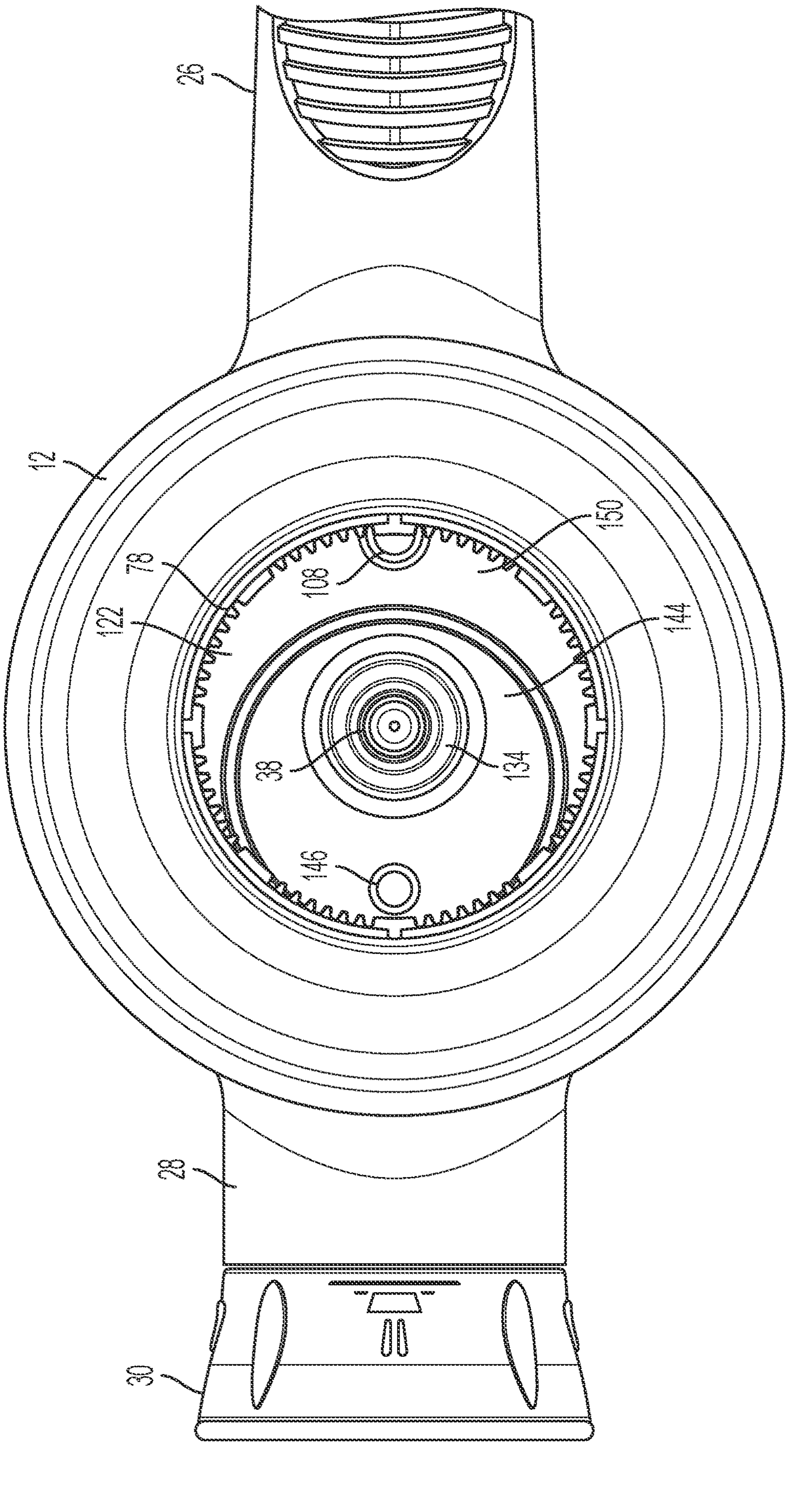
FIG. 3 is a bottom cross section view of the sprayer apparatus shown in FIG. 1.
Figure 4:
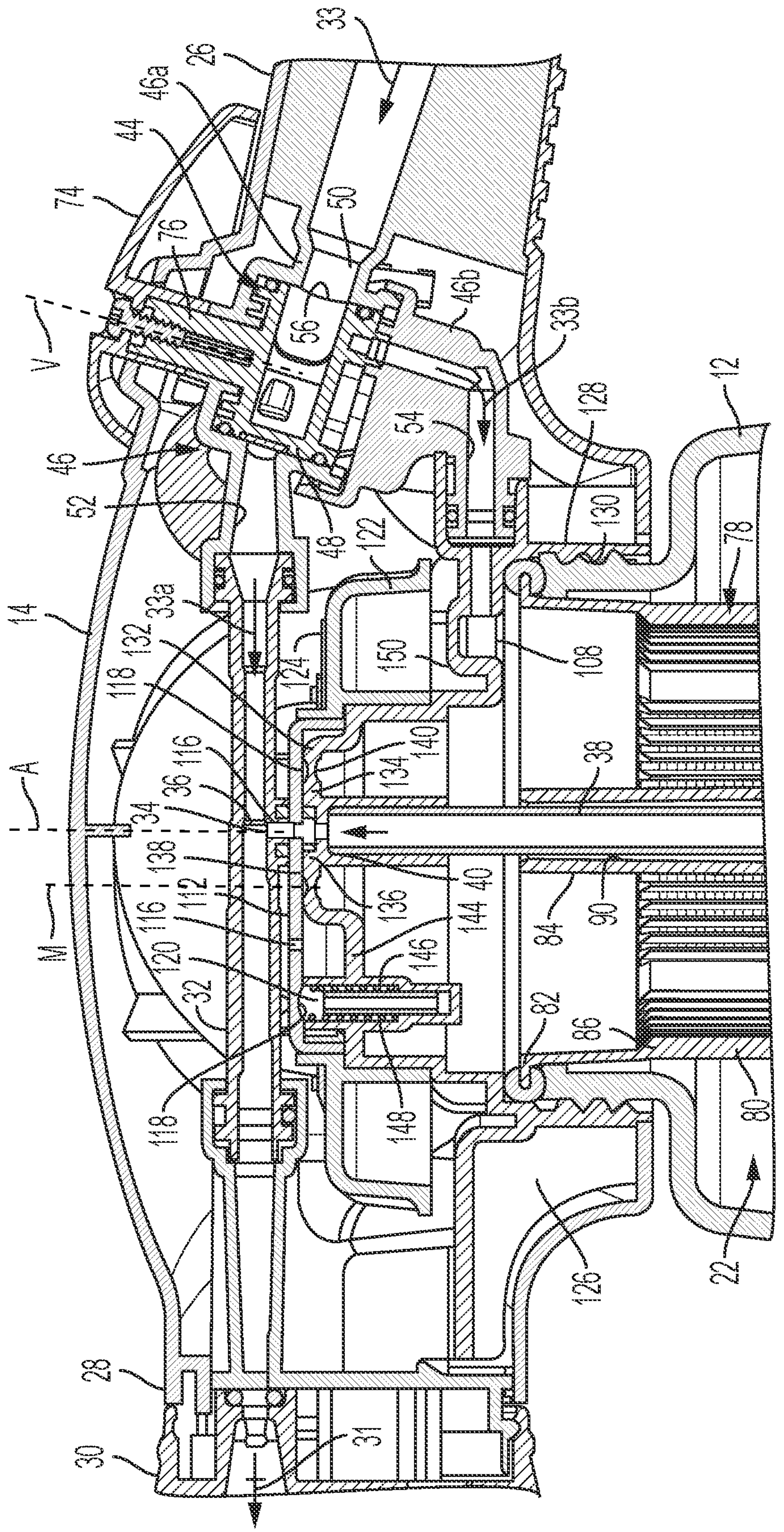
FIG. 4 is an expanded longitudinal cross view of the sprayer apparatus shown in FIG. 2.
Figure 5:
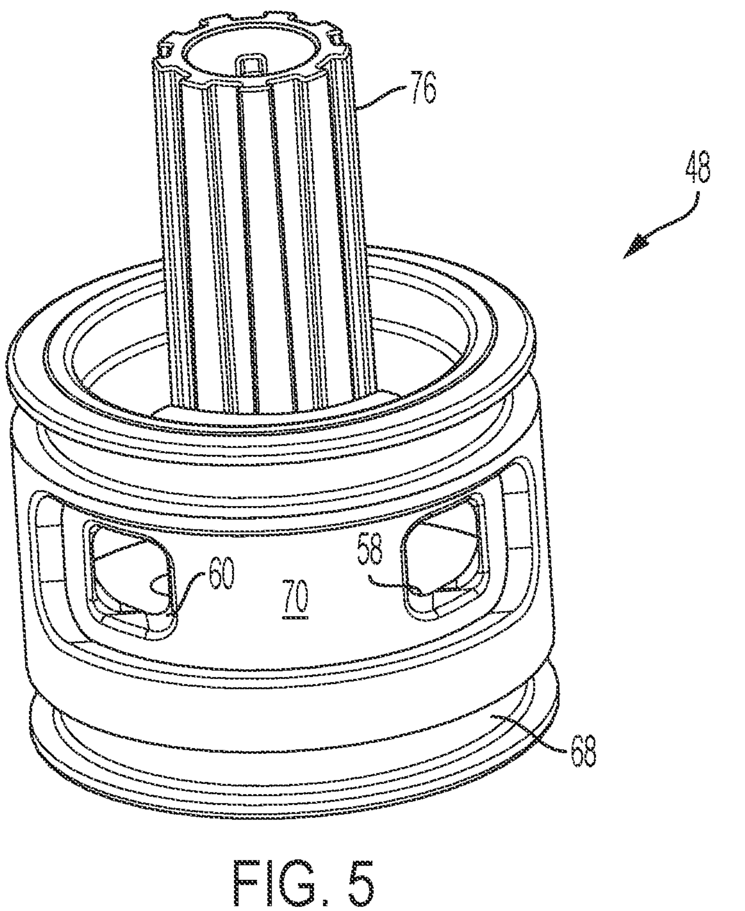
FIG. 5 is a perspective view of a valve body suitable for use within the sprayer apparatus shown in FIG. 1.
Figure 6:
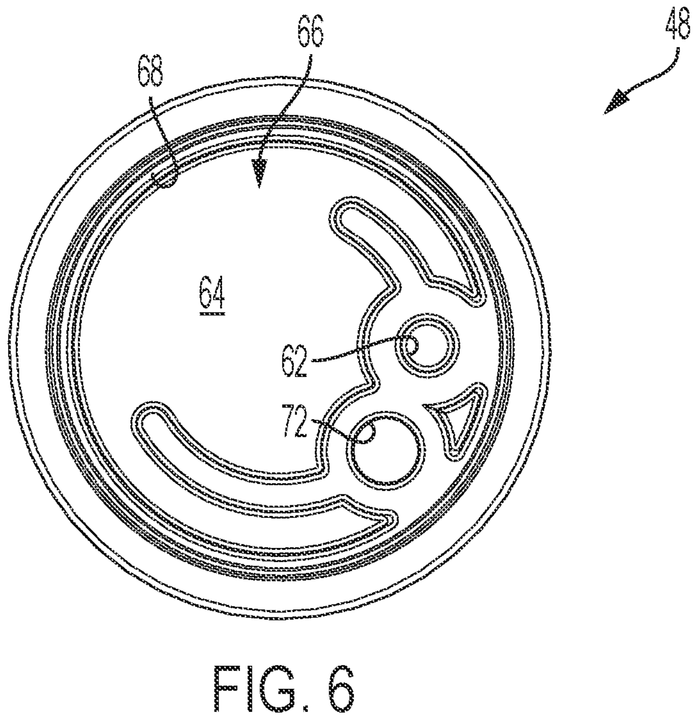
FIG. 6 is a bottom view of the valve body shown in FIG. 5.

With additional reference to FIGS. 3 and 4, sprayer head 14 includes a flow tube 32 located between inlet end 26 and outlet end 28. Flow tube 32 further defines an injection orifice 34 extending through its sidewall along a longitudinal axis A. In accordance with an aspect of the present invention, flow tube 32 may include a venturi constriction 36, with injection orifice 34 located at or downstream venturi constriction 36. Suction tube 38 is coupled to injection orifice 34 at a first end 40. Distal second end 42 of suction tube 38 extends into open interior 22 of concentrate tank 12 and, in one aspect of the present invention, is dimensioned so as to terminate proximate to but not touching bottom wall 16 of concentrate tank 12. Second end 42 may also have a beveled profile to prevent sealing of suction tube 38 against bottom wall 16. In this manner, suction tube 38 may draw fluid (e.g., liquid concentrate or dissolved solid concentrate 24) from concentrate tank 12 and inject this fluid into the water stream flowing through flow tube 32, as will be discussed in greater detail below.

With additional reference to FIGS. 5-7D, sprayer head 14 further includes a valve assembly 44 generally comprising a valve housing 46 and valve body 48 defining an axis of rotation V (see also FIG. 4). In one aspect of the present invention, valve housing 46 may be composed of an upper subunit 46*a* and lower subunit 46*b* that, when joined together, complete valve housing 46. Upper subunit 46*a* includes an inlet opening 50 in communication with inlet end 26 to receive the stream of water from the garden hose and a flow opening 52 in communication with flow tube 32. Lower subunit 46*b* includes a concentrate opening 54 in communication with open interior 22 of concentrate tank 12.

To control water flow, valve body 48 is nested between upper and lower subunits 46*a*, 46*b* when valve assembly 44 is fully assembled. Valve body 48 includes an inlet orifice 56 in communication with inlet opening 50 to receive the stream of water from the garden hose. First and second flow orifices 58, 60 are selectively positionable to independently and separately communicate with flow opening 52. Concentrate orifice 62, defined within bottom wall 64 of valve body 48, and vent opening 66, defined by bottom wall 64 and lower sidewall 68 of valve body 48, are selectively positionable to independently and separately communicate with concentrate opening 54 of lower subunit 46*b*, the operation of which will be discussed in greater detail below.

Figure 7A:
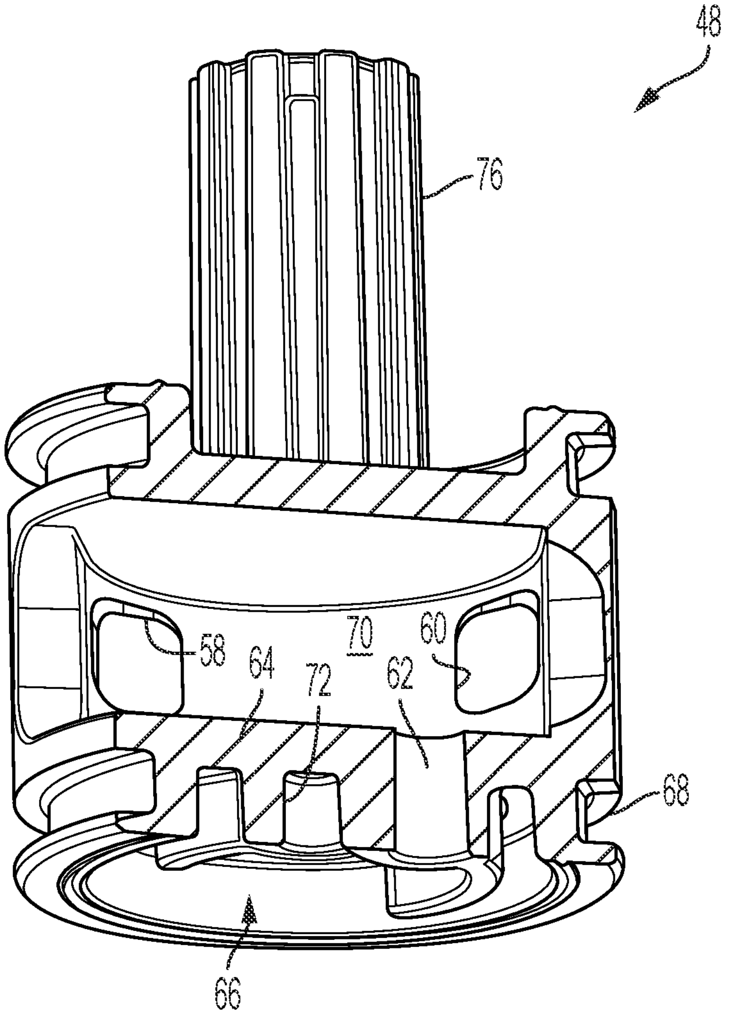
FIG. 7A is a cross section view of the valve body shown in FIG. 5.
Figure 7B:
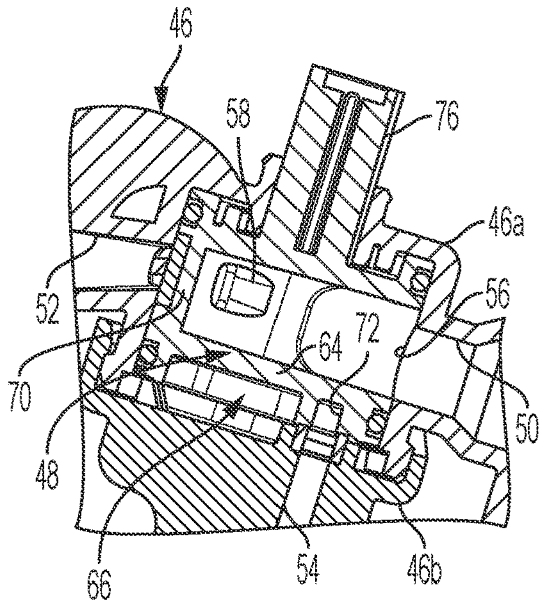
FIG. 7B is an expanded view of the valve body in a closed orientation thereby placing the sprayer apparatus in an "OFF" condition.
Figure 7C:
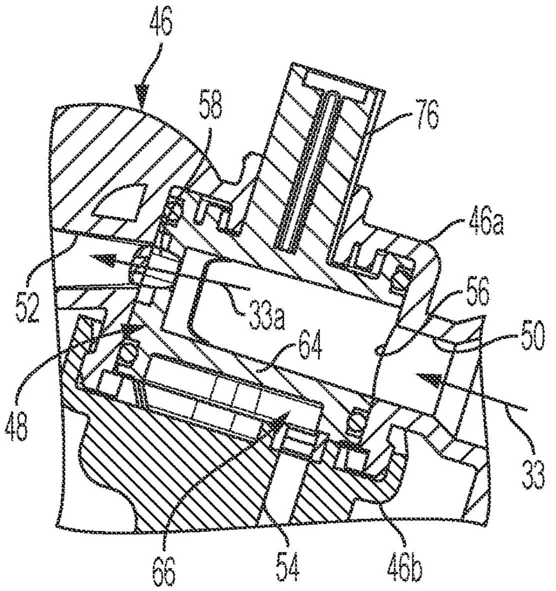
FIG. 7C is an expanded view of the valve body in a wet orientation thereby setting up the sprayer apparatus for "WET" operation.
Figure 7D:
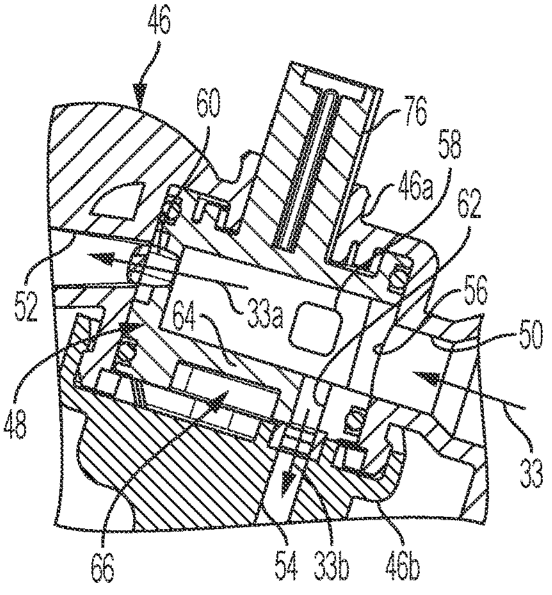
FIG. 7D is an expanded view of the valve body in a dry orientation thereby setting up the sprayer apparatus for "DRY" operation.

Valve body 48 is selectively movable within valve housing 46 to place spray head 14 in one of three orientations: closed (FIG. 7B), wet (FIG. 7C) or dry (FIG. 7D). With reference to FIG. 7B, when sprayer head 14 is in a closed orientation, valve body 48 is arranged such that neither first nor second flow orifice 58, 60 is in communication with flow opening 52 and flow opening 52 is occluded by upper sidewall portion 70 of valve body 48. Additionally, concentrate opening 54 in lower subunit 46*b* is blocked by plug member 72 defined on bottom wall 64 of valve body 48. (See also FIG. 4). As a result, should water be flowing within the garden hose, no water will enter flow tube 32 or concentrate tank 12. In other words, hose end sprayer apparatus 10 will be in an "OFF" condition (as generally indicated by indicia 74*a*—FIG. 1).

With additional reference to FIG. 7C, rotation of valve body 48 around axis of rotation V from the "OFF" condition, such as via knob 74 mounted onto shaft 76, in a first direction may place sprayer head 14 in a wet mode orientation (hose end sprayer apparatus 10 will be set for "WET" operation, as generally indicated by indicia 74*b*). Wet mode and "WET" operation is used when the starting formulation of concentrate 24 within concentrate tank 12 is a liquid. Thus, when in wet mode, valve body 48 of spray head 14 is arranged such that inlet orifice 56 is in communication with inlet opening 50 and first flow orifice 58 is in communication with flow opening 52. Thus, a stream of water received at inlet opening 50 may pass through valve body 48 into flow tube 32. With additional reference to FIG. 4, as the stream of water passes through flow tube 32, the water stream flows through venturi constriction 36 which causes a reduction in fluid pressure (creates a partial vacuum) immediately following constriction 36, e.g., at or near injection orifice 34. As suction tube 38 is coupled to injection orifice 34 at a first end 40 and extends into open interior 22 at its distal second end 42, the vacuum formed in flow tube 32 causes suction tube 38 to draw liquid concentrate 24 from concentrate tank 12 and inject the concentrate 24 into the water stream to dilute the concentrate for eventual spraying through nozzle 30. To prevent collapse of concentrate tank 12, vent opening 66 communicates with concentrate opening 54 to draw ambient air into concentrate tank 12.

With additional reference to FIG. 7D, rotation of valve body 48 from the "OFF" condition along axis of rotation V, such as continued rotation in the first direction, or rotation in a second direction, may place sprayer head 14 in a dry mode orientation (hose end sprayer apparatus 10 will be set for "DRY" operation, as generally indicated by indicia 74*c*). Dry mode and "DRY" operation utilize a starting formulation of concentrate 24 within concentrate tank 12 that is a highly viscous fluid or solid composition, such as but not limited to a gel, powder, granules or crystals. Thus, when in dry mode, valve body 48 of spray head 14 is arranged such that inlet orifice 56 is in communication with inlet opening 50 and second flow orifice 60 is in communication with flow opening 52. Concentrate orifice 62 of valve body 48 is in communication with concentrate opening 54 of lower subunit 46*b*. Thus, the bulk 33*a* of the stream of water received at inlet opening 50 passes through valve body 48 into flow tube 32 while a diverted portion 33*b* of the stream of water is directed into concentrate tank 12.

Similarly as described above with reference to FIG. 4, as bulk stream 33*a* passes through flow tube 32, the water stream flows through venturi constriction 36 which causes a reduction in fluid pressure (vacuum) immediately following constriction 36, e.g., at or near injection orifice 34. As suction tube 38 is coupled to injection orifice 34 at a first end 40 and extends into open interior 22 at its distal second end 42, the vacuum formed in flow tube 32 causes suction tube 38 to initially draw air from concentrate tank 12. The reduction of pressure within concentrate tank 12 assists directing diverted portion 33*b* of the stream of water through concentrate orifice 62 of valve body 48 and concentrate opening 54 of lower subunit 46*b* so that concentrate tank 12 maintains neutral pressure. Diverted portion 33*b* dissolves the solid concentrate (thins the gel) to form a low viscosity concentrate solution within concentrate tank. Once the fluid level of the concentrate solution overcomes distal second end 42 of suction tube 32, the concentrate solution is drawn into flow tube 32 to inject the concentrate solution into the bulk water stream 33*a* to dilute the concentrate concentration for eventual spraying through nozzle 30.

As described generally above, concentrate tank 12 of hose end sprayer apparatus 10 is configured to receive a dry concentrate. Turning now to FIGS. 2-4, concentrate tank 12 may receive such dry concentrate within a basket 78. In accordance with an aspect of the present invention, basket

78 may hold any suitable dry product including not only fertilizers, soil amendments or water amendments, but may also include dry chemicals, such as and without limitation to, pesticides, herbicides and/or fungicides.

Figure 9:
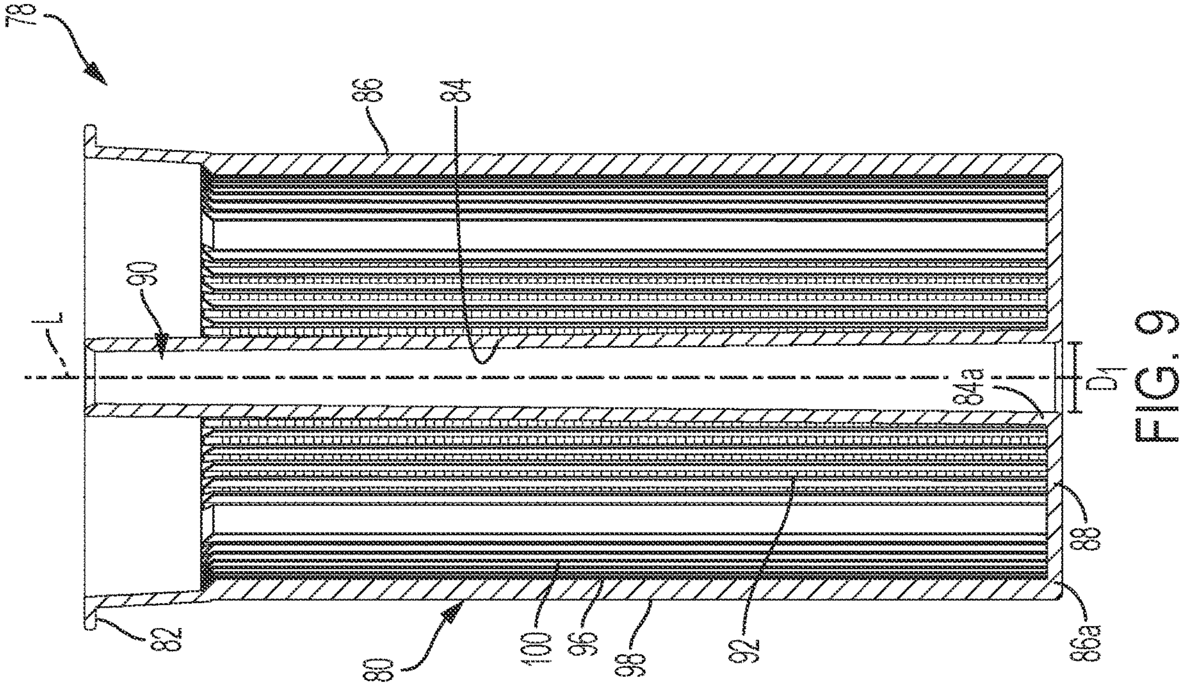
FIG. 9 is a cross section view of the basket shown in FIG. 8.
Figure 8:
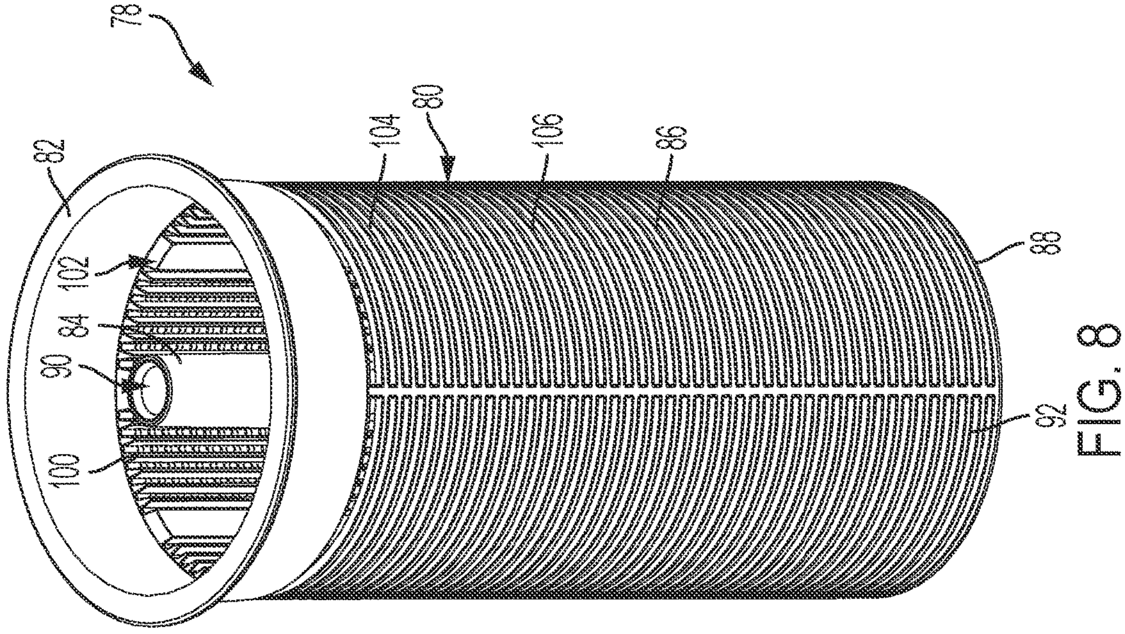
FIG. 8 is a perspective view of a basket suitable for use within the sprayer apparatus shown in FIG. 1.
Figure 10:
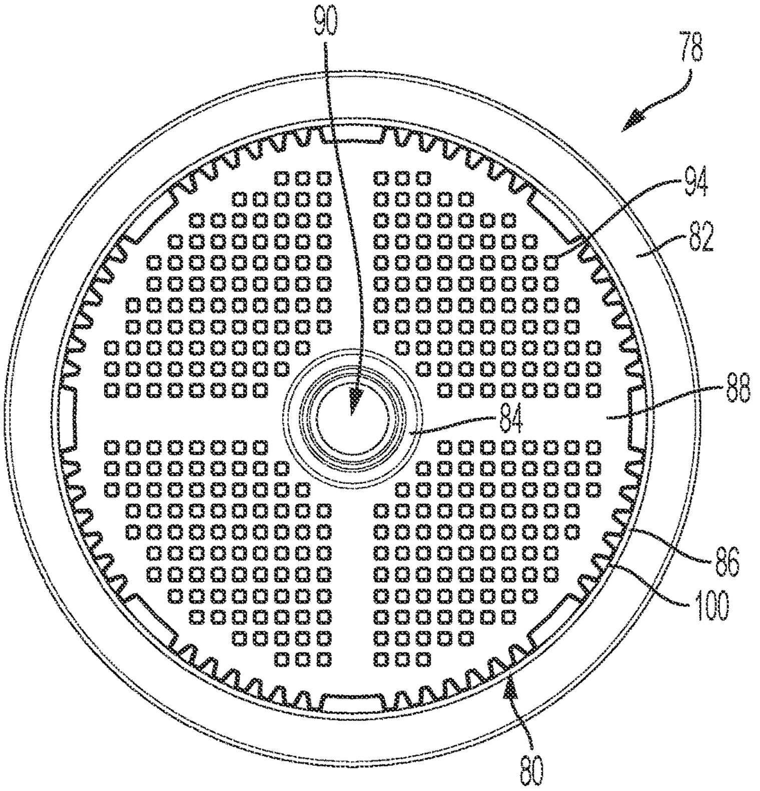
FIG. 10 is a bottom view of the basket shown in FIG. 8.

As shown most clearly in FIGS. 2 and 4, basket 78 is configured to nest within concentrate tank 12 and may be held in place through the coupling of spray head 14 with concentrate tank 12. With additional reference to FIGS. 8-10, basket 78 includes a basket body 80 having a top collar 82 configured to mount within open top edge 20 of concentrate tank 12 such that the remainder of basket body 80 is suspended within open interior 22 of concentrate tank 12. Basket body 80 further includes inner and outer basket sidewalls 84, 86, respectively. Inner and outer basket sidewalls 84, 86 are coaxially aligned along the longitudinal axis L of basket body 80 (FIG. 10). Basket bottom 88 extends between bottom edges 84*a*, 86*a* of inner and outer basket sidewalls 84, 86. Inner basket sidewall 84 has an internal diameter D1 which defines an open channel 90 along the entire length of basket body 80. Channel 90 is proportioned to receive suction tube 38 therein and allow passage of suction tube 38 therethrough such that second end 42 of suction tube 38 extends outwardly from basket body 80 beyond basket bottom 88.

As described above, basket 78 is configured to hold a dry product to be dissolved by diverted portion 33*b* of the stream of water flowing through concentrate orifice 62 of valve body 48 and concentrate opening 54 of lower subunit 46*b*. Dissolved product then exits basket 78 and is injected within the fluid flow via suction tube 38. To that end, as shown most clearly in FIGS. 9 and 10, one or both of outer basket sidewall 86 and basket bottom 88 define a plurality of openings 92, 94, respectively. In accordance with an aspect of the present invention, openings 92 and 94 are selected to be smaller than a mean particle size of the dry product loaded within basket 78. By way of example and without limitation thereto, outer basket sidewall 86 may include a first wall surface 96 and an opposite second wall surface 98 (FIG. 9). First wall surface 96 may include vertically extending, spaced grooves 100 extending through a first portion 102 of the outer basket sidewall 86. Second wall surface 98 may include horizontally extending, spaced grooves 104 extending through a second portion 106 of the outer basket sidewall 86. Openings 92 may then be formed where the vertically extending, spaced grooves 100 coincide with the horizontally extending, spaced grooves 104.

As described above, as bulk stream 33*a* of water passes through flow tube 32, the water stream flows through venturi constriction 36 which causes a reduction in fluid pressure (vacuum) immediately following constriction 36, e.g., at or near injection orifice 34. As suction tube 38 is coupled to injection orifice 34 at a first end 40 and extends into open interior 22 at its distal second end 42, the vacuum formed in flow tube 32 causes suction tube 38 to initially draw from concentrate tank 12. The reduction of pressure within concentrate tank 12 assists directing diverted portion 33*b* of the stream of water through concentrate orifice 62 of valve body 48 and concentrate opening 54 of lower subunit 46*b* so that concentrate tank 12 maintains neutral pressure. Discharge end 108 is located above basket 78 such that diverted portion 33*b* is directed into basket 78 to dissolve the solid concentrate and form a concentrate solution within concentrate tank.

In view of the above, the size and surface area of basket 78, as well as the number, location and size of openings 92, 94, are of critical importance. The surface area of basket 78 is such that it allows for dissolution of the dry product within the basket without creating appreciable resistive losses. As a result, hose end sprayer apparatus 10 stratifies the dissolved dry product solution deposited within concentrate tank 12 for consistent concentration rates over time. In a further aspect of the invention, second end 42 of suction tube 38 may also be coupled to a filter (not shown) so as to minimize or prevent introduction of particulate matter into flow tube 32.

Figure 11:
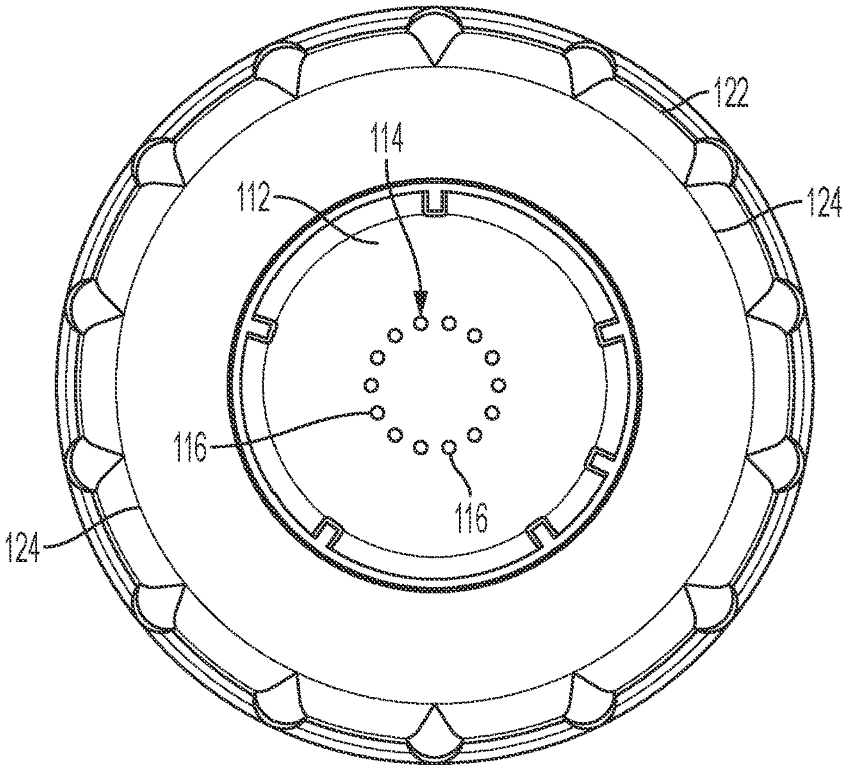
FIG. 11 is a top view of a metering plate and a dilution selector wheel suitable for use within the sprayer apparatus shown in FIG. 1.

Returning to FIGS. 1-4, with additional reference to FIG. 11, sprayer head 14 of hose end sprayer apparatus 10 may include a metering plate 112 located between first end 40 of suction tube 38 and injection orifice 34 of flow tube 32 and having an axis of rotation M. As shown most clearly in FIG. 4, axis of rotation M is disposed at an angle relative to valve body axis of rotation V. As shown most clearly in FIG. 11, metering plate 112 defines a first annular series 114 of spaced-apart flow-metering holes 116, with successive respective flow-metering holes having an increasing hole diameter. Metering plate 112 is adapted to rotate to align a selected flow-metering hole 116 in fluid communication with first end 40 and injection orifice 34 to thereby inject a selectively adjustable amount of concentrate 24 from the concentrate tank 12 into the stream of water flowing through flow tube 32. Metering plate 112 may further define a second annular series of spaced-apart stop recesses 118 whereby each respective stop recess 118 radially aligns with a respective flow-metering hole 116 (see FIG. 4). A single respective stop recess 118 receives detent 120 when the selected flow-metering hole 116 is aligned with the first end 40 and injection orifice 34, as described above. Sprayer head 14 may further include a dilution selector wheel 122 coupled to metering plate 112 whereby actuation of dilution selector wheel 122 rotates metering plate 112. Dilution selector wheel 122 includes a series of indicia 124 which visually signal to a user of sprayer apparatus 10 the setting of selected flow-metering hole 116, and therefore, the selected dilution rate of concentrate 24 within the water stream.

In a further aspect of the present invention, sprayer head 14 may be comprised of a cap portion 126 having a first end 128 which includes a cap sidewall 130 defining a longitudinal axis A configured to releasably mount cap portion 126 (and sprayer head 14) to open top edge 20 of concentrate tank 12. Second end 132 has a first planar portion 134 located between first end 40 of suction tube 38 and metering plate 112. First planar portion 134 may be configured to receive a first seal 136 located between a top face 138 of first planar portion 134 and the selected flow-metering hole 116 on metering plate 112. First planar portion 134 may further include a diaphragm 140 configured to deflect when sprayer head 14 is in the dry mode orientation. That is, when concentrate tank 12 is pressurized by diverted flow 33*b*, diaphragm 140 flexes so as to apply a force to first seal 136 to improve sealing between cap portion 126 and metering plate 112. Second end 142 of cap portion 126 may include a second planar portion 144 that defines a detent receiving well 146 configured to slidably receive detent 120 therein. A biasing member, such as spring 148, may reside in detent receiving well 146 and bias detent 120 outwardly of second planar portion 144 when detent 120 is received within stop recess 118. A third planar portion 150 may define discharge end 108.

From the above discussion, those skilled in the art will appreciate the many advantages offered by the apparatus of the present invention. By way of example and without limitation thereto, the apparatus of the present invention may comprise a 3-way valve that includes a shut off position. The valve may also operate independent from the metering plate such that the concentration of the concentrate being drawn from the concentrate tank can be varied in either the wet or dry mode orientation.

Moreover, the apparatus of the present invention may also include an internal diaphragm in the fluid path below the metering plate. Flexure of the internal diaphragm under pressure applies a greater sealing force to the seal/metering plate interface. When the concentrate tank is vented to atmosphere in "WET" mode, the seals are sealing only vacuum and seal the fluid path up through the metering plate into the fluid stream within the flow tube. When the apparatus is placed into "DRY" mode, the concentrate tank along with the fluid path up through the metering plate will be under pressure causing a pressure seal at the seal/metering plate interface. The diaphragm may use the internal pressure of the concentrate tank to deflect and apply additional force and compression to the seal, serving to make a stronger seal while the concentrate tank is under pressure.

Additionally, the apparatus of the present invention may include a basket which may be used in either "WET" or "DRY" mode. When in "WET" mode, the basket acts to filter contaminants such as grass, etc. When used in "DRY" mode, the basket provides a mesh fine enough to contain the dry concentrate while also providing enough surface area through the dry concentrate so as to not impede the flow of the fluids into and out of the concentrate tank.

Furthermore, the apparatus of the present invention may decouple the metering plate from the dilution selector wheel, thereby allowing the metering plate to float relative to the dilution selector wheel which reduces the possibility that end-user actions can create a situation where the metering plate seals might leak.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A sprayer head configured to be removably mounted onto a concentrate tank of a hose end sprayer, the sprayer head comprising:

a) a valve assembly including:

i) a valve housing having a first end including an inlet opening and a second end including a flow opening and wherein said valve housing further includes a concentrate opening configured to communicate with an open interior of the concentrate tank; and ii) a valve body within the valve housing between the inlet opening and the flow opening, the valve body being selectively movable between a closed orientation, a wet mode orientation, and a dry mode orientation, wherein said valve body further includes first and second flow orifices selectively positionable to communicate with said flow opening, a concentrate orifice selectively positionable to communicate with said concentrate opening, and a vent opening selectively positionable to communicate with said concentrate opening;

b) a flow tube having a first end coupled to the flow opening of the valve housing, wherein the flow tube includes a venturi constriction and an injection orifice at or downstream the venturi constriction; and c) a metering plate defining a first annular series of recesses comprising spaced-apart flow-metering holes, wherein successive respective flow-metering holes have an increasing hole diameter adapted to withdraw a selectively adjustable amount of a concentrate from the concentrate tank when said valve body is in said wet mode orientation and when said valve body is in said dry mode orientation.

2. The sprayer head of claim 1, wherein said valve assembly further includes a knob coupled to a shaft on said valve body for selectively rotating said valve body.

3. The sprayer head of claim 1, wherein said sprayer head further includes a dilution selector wheel coupled to said metering plate, wherein actuation of said dilution selector wheel rotates said metering plate.

4. The sprayer head of claim 3, wherein said dilution selector wheel includes indicia providing operational information of a respective flow-metering hole.

5. The sprayer head of claim 1, wherein said metering plate further defines a second annular series of spaced-apart recesses comprising stop recesses, wherein each respective stop recess within said second annular series of recesses radially aligns with a respective flow-metering hole of said first annular series of recesses.

6. The sprayer head of claim 5, wherein a single respective stop recess receives a detent when said selected flow-metering hole is aligned with said injection orifice of said flow tube.

7. The sprayer head of claim 1, further comprising a cap portion having a first end including a cap sidewall configured to releasably mount said cap portion to an open top edge of said concentrate tank.

8. The sprayer head of claim 1, wherein said valve body has a first axis of rotation and wherein said metering plate has a second axis of rotation which intersects with said first axis of rotation and forms an acute angle therebetween.

9. A sprayer head configured to be removably mounted onto a concentrate tank of a hose end sprayer, the sprayer head comprising:

a) a valve assembly including:

i) a valve housing having a first end including an inlet opening and a second end including a flow opening and a concentrate opening configured to communicate with an open interior of the concentrate tank; and ii) a valve body within the valve housing between the inlet opening and the flow opening, wherein said valve body further includes first and second flow orifices selectively positionable to communicate with said flow opening, a concentrate orifice selectively positionable to communicate with said concentrate opening, and a vent opening selectively positionable to communicate with said concentrate opening, the valve body being selectively movable between a closed orientation, a wet mode orientation, and a dry mode orientation, wherein said valve body has a first axis of rotation;

b) a flow tube having a first end coupled to the flow opening of the valve housing, wherein the flow tube includes a venturi constriction and an injection orifice at or downstream of the venturi constriction; and c) a metering plate defining a first annular series of recesses comprising spaced-apart flow-metering holes, wherein successive respective flow-metering holes have an increasing hole diameter adapted to withdraw a selectively adjustable amount of a concentrate from the concentrate tank when said valve body is in either said wet mode orientation or said dry mode orientation, wherein said metering plate has a second axis of rotation which intersects with said first axis of rotation and forms an acute angle therebetween.

10. The sprayer head of claim 9, wherein said valve assembly further includes a knob coupled to a shaft on said valve body for selectively rotating said valve body.

11. The sprayer head of claim 9, wherein said sprayer head further includes a dilution selector wheel coupled to said metering plate, wherein actuation of said dilution selector wheel rotates said metering plate.

12. The sprayer head of claim 11, wherein said dilution selector wheel includes indicia providing operational information of a respective flow-metering hole.

13. The sprayer head of claim 9, wherein said metering plate further defines a second annular series of spaced-apart recesses comprising stop recesses, wherein each respective stop recess within said second annular series of recesses radially aligns with a respective flow-metering hole of said first annular series of recesses.

14. The sprayer head of claim 13, wherein a single respective stop recess receives a detent when said selected flow-metering hold is aligned with said injection orifice of said flow tube.

15. The sprayer head of claim 9, further comprising a cap portion having a first end including a cap sidewall configured to releasably mount said cap portion to an open top edge of said concentrate tank.

* * * * *